June 8, 1965  R. N. LEVINN  3,188,431
INFINITE HEAT SWITCH
Filed March 22, 1962

INVENTOR.
ROBERT N. LEVINN
BY James and Franklin
ATTORNEYS

United States Patent Office 3,188,431
Patented June 8, 1965

3,188,431
INFINITE HEAT SWITCH
Robert N. Levinn, Catskill, N.Y., assignor to American Thermostat Corporation, South Cairo, N.Y., a corporation of New York
Filed Mar. 22, 1962, Ser. No. 181,633
9 Claims. (Cl. 200—122)

The present invention relates to a self-cycling thermostat assembly with a built-in heater element which constitutes a self-contained heat source for the thermostat, permitting the device to be controlled to control the delivery of varying amounts of heat as desired.

There are a great number of installations where accurate control of heat input is desired and where that control can, within designed limits, be controlled in a continuous or infinite manner rather than in a step-by-step manner. Typical of such installations are hot plates, table stoves, small ovens, roasters, broilers, sealing machines and other household, industrial and laboratory devices of similar type. The thermostat controller of the instant invention is designed to produce an on-off type of operation of the electrically heated external device and to control the duration of the "on" portion of the cycle thereof, thereby to control the amount of heat delivered.

Thermostat control of various types of electrically energized appliances is common, and in many instances an on-off cycling action is produced. When the external device being controlled is to reach and maintain a particular temperature, the action of the thermostat is designed to be controlled by the temperature of that external device. While the device of the instant invention can be used to control temperature, it is, however, more specifically designed to control the amount of heat developed by the controlled device, the temperature of that controlled device being dependent in part upon the amount of heat developed thereby and in part by other factors, such as the rate at which heat is removed therefrom.

In temperature-controlling thermostats of the prior art, in certain instances auxiliary heating means have been made active on the thermostat and are controlled by the thermostat itself. In some instances a separate heating element is used. This is relatively expensive, both with regard to cost of components and assembly thereof, takes up valuable space, and has a thermal efficiency vis-a-vis the thermostat which is quite low, largely because heat is transmitted from the heater to the thermostat by convection, by heating the air space within which the thermostat is located.

In other instances current is caused to pass through the thermostatically sensitive element itself, that element being formed in part of a high resistance conductor of electricity which generates heat when electricity passes through it. This involves a compromise in the materials of which the thermostatically sensitive element is formed, and hence militates against optimum thermostatic sensitivity thereof.

The prime object of the present invention is to produce an inexpensive unitary thermostatically operated switch assembly with a built-in thermostat heater which will function as an infinite heat control, and in particular such a device in which (a) the heater element and the thermostatic element are each designed in a manner best adapted to their respective functions, and (b) the transmission of heat from the heater element to the thermostatic element is accomplished with maximum efficiency. It is a further prime object of the present invention to use in such an assembly, to as great a degree as possible, standard pre-existing components, and to have the overall construction of conventional size and shape.

In accordance with the present invention I use what is essentially a standard thermostatic switch construction, preferably of the stacked type, and I incorporate thereinto a separate heater element especially designed to cooperate with said standard construction and to be assembled therewith in a simple and reliable manner, without having to employ separate electrical connections therefor. Moreover, heat transfer is accomplished by direct thermal conduction, thus making for a high degree of efficiency.

More specifically, the assembly comprises, in the preferred embodiment here specifically illustrated, a stack of terminals, resilient conductive contact-carrying arms, an adjustable arm-biasing device, and a bendable bimetallic thermostatic strip which controls the opening and closing of the contacts. The heater element comprises a strip of high resistance conductive material one end of which is in electrical conductive engagement with one terminal and the other end of which is in electrical conductive engagement with a corresponding contact-carrying arm. An intermediate portion of that strip is in heat-conductive engagement with the thermostatic strip, and preferably with that portion of the thermostatic strip clamped in the stack support. A heat spreader, such as a metallic washer, may be interposed between the heat-transfer portions of the thermostat and heater strips so as to maximize the portion of the thermostat strip to which heater-produced heat is applied. The heater strip thus performs the dual functions of electrically connecting a terminal to its corresponding contact-carrying arm, and generating heat and conveying that heat to the thermostat strip whenever the contacts are closed and current flows through the heater strip. All of the elements of the assembly, apart from the heater strip, are conventional and all of the elements of the assembly, including the heater strip, are easily assembled with one another and are reliably held in assembled position.

To the accomplishment of the above, and to such other objects as may hereinafter appear, the present invention relates to the construction of a thermostatic switch assembly with a built-in heater, as defined in the appended claims and as described in this specification, taken together with the accompanying drawings, in which:

Figure 1:
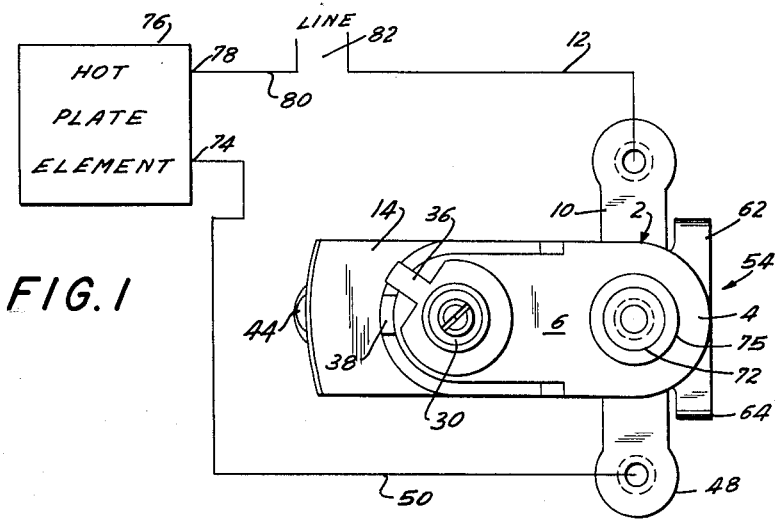
FIG. 1 is a top plan view of a preferred embodiment of the present invention, shown schematically connected in an electrical circuit with which it is to be used.

The preferred embodiment of the present invention here illustrated comprises a stack support generally designated 2. The stack support includes a mounting arm 4 having a portion 6 extending out from the stack 2. An upper terminal 8 has a portion 10 extending out from the stack to which a wire 12 is adapted to be connected. A resilient conductive arm 14 has a portion 16 clamped in the stack against the terminal 8, the arm 14 extending beneath the mounting arm portion 6 and carrying a contact 18 adjacent its free end. A second resilient conductive arm 20 has a portion 22 clamped in the stack, separated from the portion 18 of the arm 16 by insulating washers 24 and 25. The arm 20 extends beneath the arm 14 and carries a contact 26 adjacent its free end which is adapted to move into and out from engagement with the contact 18. The arms 14 and 20 are conductive and are resiliently biased in a sense to bring the contacts 18 and 26 into engagement with one another.

The mounting arm 4 is provided with an aperture 28 in which adjustment shaft 30 is threadedly received, the tip 32 of that shaft passing freely through an aperture 34 in the arm 14 and engaging the upper surface of the arm 20, thus fixing the position thereof in accordance with the axial position of the shaft 30. A finger 36 is provided on the shaft 30, cooperable with a stop 38 extending up from the mounting arm 6, to limit the degree of rotation, and hence the axial position, of the shaft 30.

Mounted in the stack 2 beneath the arm 20, and separated therefrom by an insulating washer 40, is a bimetallic thermostat strip 42 which carries a stud 44 at its free end, that stud engaging the underside of the arm 14, thereby controlling the position of that arm. The strip 42 is designed to bend upwardly, as viewed in FIG. 2, as it is heated, thereby to tend to separate the contact 18 from the contact 26, and to bend downwardly as it cools, thereby to tend to move the contact 18 toward and into engagement with the contact 26.

A lower terminal 46 has a portion 48 extending out from the stack 2 in a direction opposite to that of the portion 10 of the upper terminal 8, and a wire 50 is adapted to be electrically connected thereto. An insulating washer 52 is positioned above the terminal 46.

The heater element, generally designated 54, is formed from a strip of conductive but high resistance metal, and comprises end portions 56 and 58 and intermediate portion 60, all of which may be of a size comparable to that of the other elements in the stack 2, the portions 56 and 60 and 58 and 60 respectively being connected to one another by strip parts 62 and 64 respectively, which are shown as appreciably narrower than the portions 56, 58 and 60. The strip portion 58 is clamped in the stack 2 in engagement, and hence in electrical connection, with the portion 22 of the conductive arm 20, being sandwiched between the arm portion 22 and the insulating washer 40. The strip portion 60 is clamped in the stack 2 between the insulating washer 52 and the bimetallic strip 42. It may be in direct engagement with the bimetallic strip 42, but it is preferred that a washer 68 of heat-transmissive material be interposed therebetween so as to spread the heat from the strip 54 over as great an area of the bimetallic strip 20 as is feasible. The strip part 62 extends out from the strip portion 56 beyond the stack 2 and then curves back into the stack 2 at the strip portion 60, while the strip part 64 extends out from the strip portion 60 beyond the stack 2 in a direction opposite to that of the part 62 and then curves back into the stack 2 at the strip portion 58. Thus, by selecting a given length for the strip parts 62 and 64, the overall length of the heater strip 54, and hence the amount of heat produced thereby when current passes therethrough, is determined.

An insulating washer 70 is interposed between mounting arm 4 and the upper terminal 8, and an insulating washer 66 is positioned beneath the heater element portion 56. The stack is held together by a rivet 72 which passes through central apertures in the various elements of the stack 2. The insulating washers 25, 40, 52 and 66 have central vertical extensions extending between the rivet 72 and the central apertures of the elements in the stack which are in the electrical circuit, thereby to insulate them from the rivet 72. The various insulating washers are preferably formed of ceramic material, thus being both electrically and thermally insulating.

In a typical, and idealized, installation, as shown in FIG. 1, the wire 50 is connected to one end 74 of an electric heater 76 of an appliance, generally designated as a hot plate, the other end 78 thereof having wire 80 extending therefrom the wires 12 and 80 being connected to any suitable source of electricity, such as the power line 82.

Figure 2:
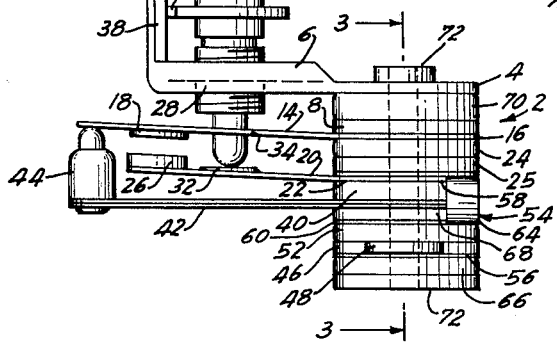
FIG. 2 is a side elevational view of the embodiment of FIG. 1.
Figure 3:
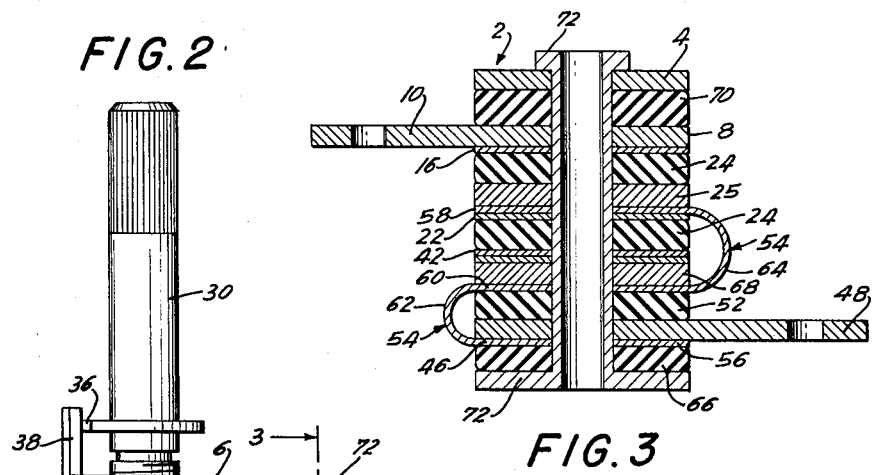
FIG. 3 is a cross sectional view taken along the line 3—3 of FIG. 2.

The switch is initially in its position shown in FIG. 2, with the contacts 18 and 26 separated, the circuit through the heater element 54 and the hot plate element 76 being open. When the switch is to be turned on the shaft 30 is rotated so that it moves upwardly. This permits the spring arm 20 carrying the contact 26 to rise, the contact 26 engaging the contact 18 and closing the electrical circuit. The resilient strength of the arm 20 exceeds that of the arm 14, thus lifting the arm 14 up out of contact with the stud 44. Current flowing through the electrical circuit produces heat in the hot plate element 76 and also produces heat in the heater element 54. Heat from the latter raises the temperature of the bimetallic thermostatic strip 42 and causes that strip to bend upwardly. It will continue to bend until the stud 44 engages the arm 14 and raises that arm sufficiently to lift contact 18 from contact 26, thus opening the electrical circuit. Since, when the electrical circuit is open, the heater element 54 is no longer energized, the thermostatic strip 42 will cool and bend downwardly until the contacts 18 and 26 re-engage, thus again closing the electrical circuit and re-energizing the heater element 54 and the hot plate element 76. The relative times during which the electrical circuit will be closed and open respectively will be determined by the vertical position of the shaft 30—the higher that shaft is moved, the longer will the contacts 18 and 26 remain engaged. Hence the position of the shaft 30 determines the average amount of heat developed at the hot plate element 76 by controlling the relative amount of time that said hot plate element 76 is energized as compared with the amount of time that it is de-energized.

The hot plate element 76 may or may not have a thermal effect on the bimetallic strip 42. During cycling the heater strip 54 will have primary, if not exclusive, control thereover, not only because of its proximity thereto but also because of its direct heat-transmissive operative connection therewith. Hence cycling of the switch can be effective to maintain the temperature of the hot plate element 76 at a substantially constant value, preselected by adjustment of the shaft 30.

The terminals 8 and 46, the arms 14 and 20 and their respective contacts 18 and 26, the bimetallic strip 42, the adjustment shaft 30 and its associated parts, indeed, all of the elements except for the heater strip 54 and the heat spreading washer 68, are of conventional construction and may be assembled in conventional manner. The heater strip 54 and washer 68, if used, are readily manufactured on a production basis, are equally readily incorporated into the stack 2, and the strip 54 defines the electrical connection between the terminal 46 and the conductive arm 20. The heater strip 54 is, by the mere act of assembly, placed in series with the switch defined by the contacts 18 and 26 and placed in efficient thermal transfer connection with the bimetallic strip 42. The overall assembly is sturdy, reliable, inexpensive, and exceptionally effective in performing its designed functions.

Although the bimetallic thermostatic strip 42 has been here disclosed in simple form, other more complicated thermostatically sensitive elements could be employed Purely by way of example, the bimetallic strip could be of the compound type, having two sections each bendable in opposite directions with an increase in temperature, in order to cause the operation of the switch to be substantially independent of ambient temperature conditions.

While but a single embodiment of the invention is here specifically disclosed, it will be apparent that many variations may be made therein, all within the scope of the invention as defined in the following claims.

I claim:

1. A thermostat assembly comprising a support, a pair of contacts, means mounting said contacts on said support for movement toward and away from one another, a pair of terminals on said support, first and second electrical connections mounted on said support and connected to and extending between said terminals and said contacts respectively, and thermostatic means on said support, operatively connected to said contacts, and effective to control the relative position of said contacts in accordance with the temperature sensed thereby, said thermostatic means having a first part directly mounted on said support and a second part extending out from said support, one of said electrical connections between one of said terminals and the contact corresponding thereto comprising a high resistance conductive heater element in operative heat-transfer relation to said first part of said thermostatic means.

2. The assembly of claim 1, in which said high resistance conductive element comprises a strip a portion of which, between said one of said terminals and said corresponding contact, extends out from and back to said support.

3. A thermostat assembly comprising a support, a pair of contacts, means mounting said contacts on said support for movement toward and away from one another, a pair of terminals on said support, first and second electrical connections mounted on said support and connected to and extending between said terminals and said contacts respectively, and thermostatic means on said support, operatively connected to said contacts, and effective to control the relative position of said contacts in accordance with the temperature sensed thereby, said thermostatic means having a first part directly mounted on said support and a second part extending from said support, one of said electrical connections between one of said terminals and the contact corresponding thereto comprising a high resistance conductive heater element operatively thermally engaging said first part of said thermostatic means substantially within the confines of said support in a conductive heat-transfer manner.

4. The assembly of claim 3, in which said high resistance conductive element comprises a strip a portion of which, between said one of said terminals and said corresponding contact, extends out from and back to said support.

5. In a thermostatic assembly comprising a stack support and, mounted along and extending from said support, first and second conductive arms, opposing contacts carried by said arms, said arms being articulate whereby said contacts can move toward and away from one another, first and second terminals, first and second electrical connections between said first and second terminals and arms respectively, and thermostatic means operatively connected to at least one arm and effective to control the relative position of said contacts in accordance with the temperature sensed thereby; the improvement which comprises said first terminal and said first arm being spaced from one another along said support, said first electrical connection between said first terminal and said first arm comprising a strip of high resistance conductive heater material secured to said stack support at spaced points along said strip and extending out beyond said support between said points, said strip being in operative heat-transfer relation with said thermostatic means.

6. The assembly of claim 5, in which said thermostatic means is positioned on said support between and spaced from said first terminal and said first arm respectively.

7. The assembly of claim 5, in which said thermostatic means is positioned on said support between and spaced from said first terminal and said first arm respectively, said strip extending out from said support in one direction between said first terminal and said thermostatic means and extending out from said support in a different direction between said thermostatic means and said first arm.

8. In a thermostat assembly comprising a stack support and, mounted along and extending from said support, first and second conductive arms, opposing contacts carried by said arms, said arms being articulate whereby said contacts can move toward and away from one another, first and second terminals, first and second electrical connections between said first and second terminals and arms respectively, and thermostatic means operatively connected to at least one arm and effective to control the relative position of said contacts in accordance with the temperature sensed thereby; the improvement which comprises said first terminal and said first arm being spaced from one another along said support, said first electrical connection between said first terminal and said first arm comprising a strip of high resistance conductive heater material secured to said stock support at spaced points along said strip and extending out beyond said support between said points, said strip operatively thermally engaging said thermostatic means within the confines of said stock support in a conductive heat-transfer manner.

9. In a thermostat assembly comprising a stack support and, mounted along and extending from said support, first and second conductive arms, opposing contacts carried by said arms, said arms being articulate whereby said contacts can move toward and away from one another, first and second terminals, first and second electrical connections between said first and second terminals and arms respectively, and thermostatic means operatively connected to at least one arm and effective to control the relative position of said contacts in accordance with the temperature sensed thereby; the improvement which comprises said first terminal and said first arm being spaced from one another along said support, said first electrical connection between said first terminal and said first arm comprising a strip of high resistance conductive heater material secured to said stack support at at least three spaced points along said strip and extending out beyond said support between each adjacent pair of said points, said strip being in operative heat-transfer relation with said thermostatic means.

References Cited by the Examiner

UNITED STATES PATENTS

| 2,741,682 | 4/56 | Schwaneke | 200—138 |
| 2,774,846 | 12/56 | Lee | 200—138 |
| 2,854,548 | 9/58 | Cassidy | 200—138 X |

FOREIGN PATENTS

| 494,087 | 7/46 | Canada. |

BERNARD A. GILHEANY, *Primary Examiner.*